Figure 1:
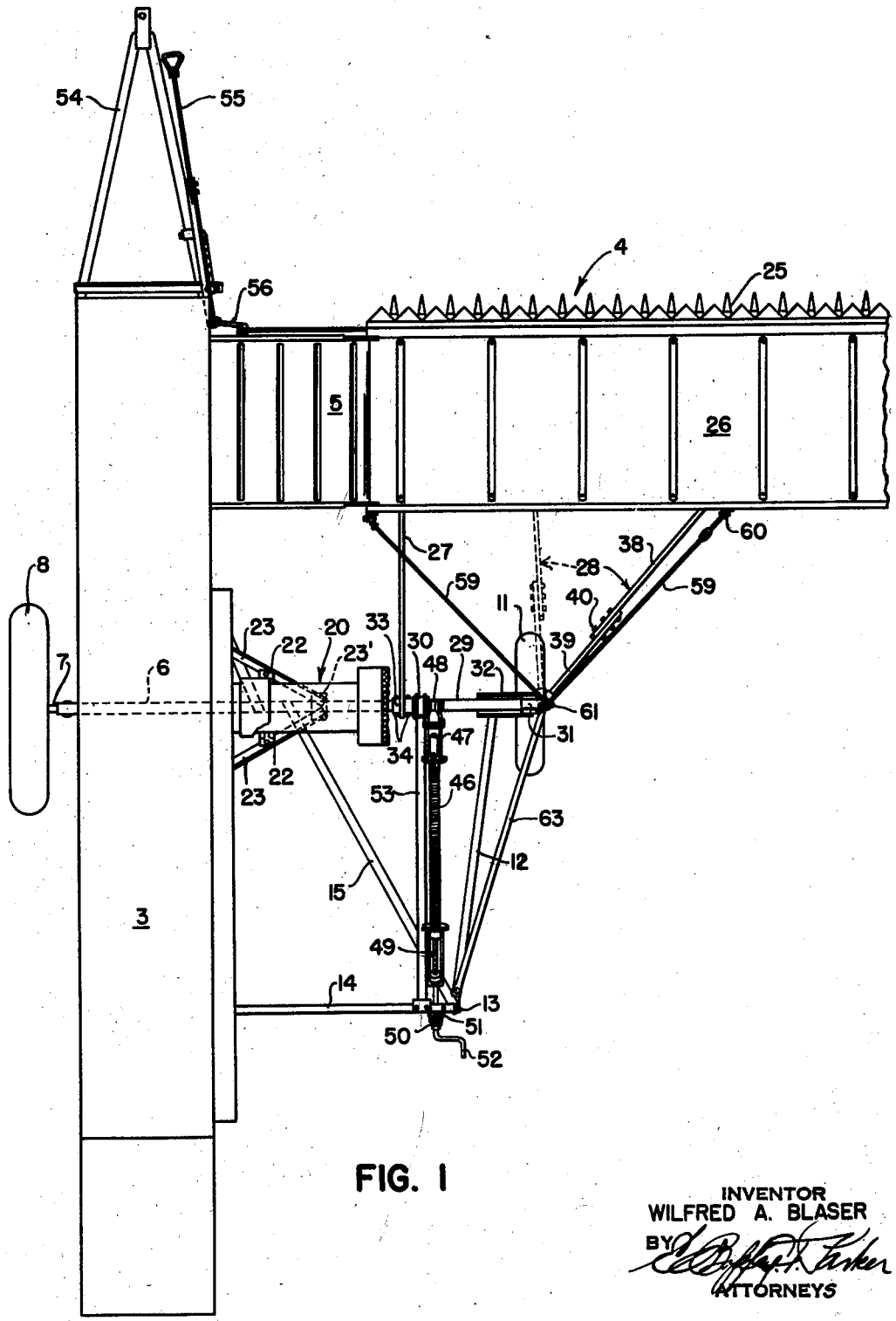

INVENTOR
WILFRED A. BLASER

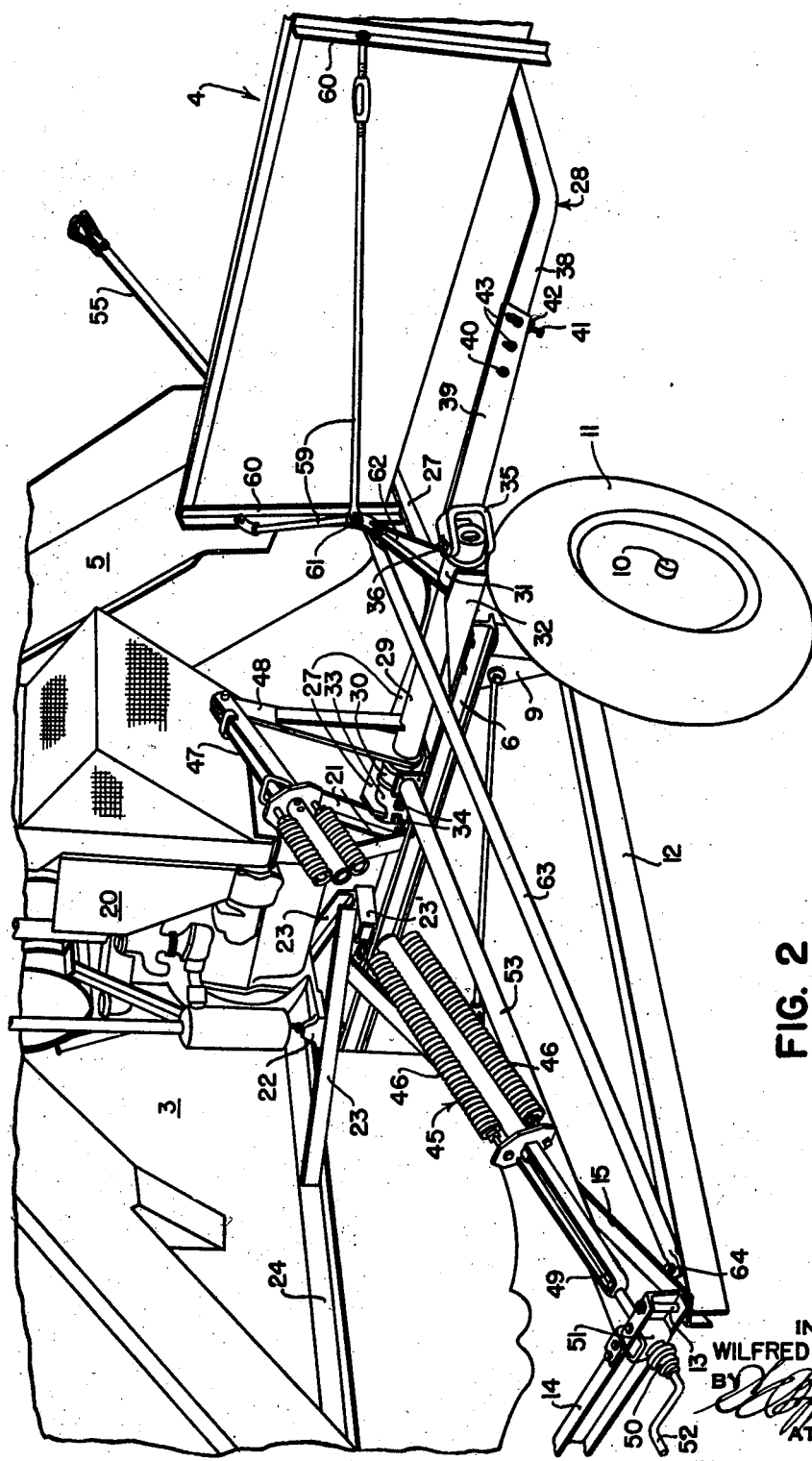

Patented June 22, 1943

2,322,276

UNITED STATES PATENT OFFICE 2,322,276

HARVESTER PLATFORM MOUNTING MEANS

Wilfred A. Blaser, Moline, Ill., assignor to Deere & Company, Moline, Ill., a corporation of Illinois Application November 6, 1941, Serial No. 418,019

11 Claims. (Cl. 56—122)

The present invention relates generally to harvesting machines and more particularly to those harvesters comprising a longitudinally extending crop treating body and a laterally extending harvester platform associated therewith, such as, for example, harvester threshers or combines. The principal object of this invention relates to the provision of a novel and simple means for mounting the harvester platform on the thresher body, but which is strong and durable. A more specific object of this invention has to do with the provision of a simplified means for mounting a platform on a combine of the type in which a longitudinally extending body is balanced on a single transversely disposed axle beam, in which provision is made for quickly and easily detaching the platform from the platform supporting arms for transport purposes. A related object has to do with the provision for swinging the grainward arm inwardly after the platform has been removed, to permit the combine to be transported through narrow gates when traveling from one field to another. Still another object relating to a two-wheel type combine in which the single transverse axle beam forms substantially the sole frame for the combine, has to do with the provision of means for mounting a motor unit for driving the mechanism within the body of the machine, and also mounting the harvester platform in the limited space available on the transverse axle beam.

These and other objects and advantages of my invention will be apparent to those skilled in the art after a consideration of the following description, in which reference is had to the drawings appended hereto, in which Figure 1 is a plan view of a harvester thresher embodying the principles of the present invention; and Figure 2 is a fragmentary view in perspective, showing the means for mounting the motor and the harvester platform together on the single axle beam.

Referring now to the drawings, the combine comprises a longitudinally extending thresher body 3, a transversely disposed harvester platform 4, extending laterally from the grainward side of the body 3 and connected thereto by means of a conventional conveyor section 5, which conveys harvested crops from the platform 4 to the forward end of the thresher body 3.

The body 3 of the combine is supported on a transversely extending beam 6, the stubbleward end of which is provided with a stub axle 7 fixed thereto, on which is journaled a suitable supporting wheel 8. The grainward end of the beam has a depending wheel supporting arm 9 fixed to the lower side thereof, and at the lower end of the arm 9 is mounted a stub axle 10 on which is journaled a grainward wheel 11. A longitudinal frame member 12 is fixed at its forward end to the depending arm 9 and extends rearwardly therefrom, and is connected at its rearward end by a bolt 13 to a transverse frame member 14 extending laterally from the thresher body 3. A diagonal frame member 15 is also connected at its rearward end to the bolt 13 and is inclined forwardly and inwardly, and the forward end is supported on the transverse beam 6.

The body 3 of the harvester is mounted adjacent the stubbleward end of the supporting beam 6 and contains the usual threshing and separating mechanism, which receives power from a motor unit 20, preferably a conventional gasoline engine disposed on a transverse axis above the main axle beam 6. The outer end of the motor 20 is supported on a bracket 21, comprising a pair of downwardly converging supporting members which are fixed at their lower ends to the beam 6. The other end of the motor unit rests on a pair of legs 22, which are supported on a pair of frame members 23, carried at their stubbleward ends on a longitudinally extending frame member 24 of the body 3 and converging grainwardly therefrom, the outer ends of the members 23 being supported on a block 23', fixed to the transverse beam 6. The bracket 21 and the outwardly converging frame members 23 provide a rigid three-point support for the motor unit 20 on the single transverse beam member 6.

The harvester platform 4 is provided with the usual cutting mechanism 25 along the forward edge thereof, and a canvas conveyor 26 for conveying the crops cut by the cutting apparatus 25 laterally and inwardly to the elevator 5. The platform 4 is carried on a pair of laterally spaced supporting arms 27, 28, which extend under the platform and are detachably connected thereto by any suitable means, the details of which are not a part of the present invention. The rear ends of the supporting arms 27, 28 are attached to a transverse rock shaft 29, which is disposed above the main transverse beam 6 substantially parallel thereto, and is journaled in a pair of laterally spaced bearings 30, 31. The stubbleward bearing 30 is fixed to the top surface of the beam 6, while the grainward bearing 31 is fixed within a structural angle member 32, which is bolted to the top of the beam 6 at the grainward end thereof and forms an extension of the latter out over the grainward wheel 11.

The rear end of the stubbleward arm 27 is welded to a short sleeve 33, which is fixed by bolts 34 on the inner end of the rock shaft 29, the latter terminating adjacent the motor supporting bracket 21. The rear end of the outer platform supporting arm 28 is provided with a clevis 35, which is pivotally connected by means of a pivot bolt 36 to the grainward end of the rock shaft 29, which terminates over the wheel 11. The pivot bolt 36 is normally disposed vertically, or substantially so, permitting the arm 28 to be swung horizontally between the normal operating position, shown in solid lines in Figures 1 and 2 and the dotted line position shown in Figure 1 in which the arm is set for transport purposes, as will be explained later in more detail. Normally, the supporting arm 28 is inclined forwardly and grainwardly to a point of connection with the harvester platform, which is spaced grainwardly of the outer end of the rock shaft 29 and of the grainward wheel 11. The arm 28 is composed of a pair of pivotally connected sections 38, 39, which are pivotally secured together by a bolt 40 and can be angularly adjusted relative to each other by means of an adjusting screw 41, which is threaded through an opening in a lug 42 welded to the rear section 39 of the arm, the screw 41 being positioned to bear against the forward section 38, so that by tightening the screw 41 against the forward section 38, the latter can be raised relative to the rearward section 39, for the purpose of leveling the platform. The arm sections 38, 39 are rigidly secured together in adjusted position by means of a pair of bolts 43, which extend through suitable slots in the rearward arm 39 and are engaged in threads in the forward section 38.

The platform 4 is counterbalanced by means of a counterbalancing spring member 45 comprising a pair of tension springs 46 connected at their forward ends by means of a strap member 47 to an arm 48 which is rigidly welded to the rock shaft 29 and extends upwardly therefrom. The rear ends of the springs 46 are connected through a crank screw 49 and bearing 50 to a bracket 51 on the rear transverse frame member 14. The tension in the spring can be adjusted by means of a crank handle 52 fixed to the crank screw 49. This counterbalancing spring unit is described in greater detail in Patent 1,933,535, granted to Apel on November 7, 1933. The reaction of the springs 46 is resisted by means of a longitudinally extending compression frame member 53, connected at its rearward end to the transverse frame member 14 and at its forward end to the stubbleward bearing 30 of the rock shaft 29.

The combine is propelled by a suitable draft frame 54, which is connected to a tractor in the usual manner. The platform 4 is raised and lowered by means of a manual control lever 55, mounted at the forward end of the body and extending forwardly to within convenient reach of the operator of the tractor and is connected by suitable linkage 56 to the platform frame. As the platform is raised and lowered about the axis of the rock shaft 29, it is maintained level in a fore and aft direction by means of a pair of links 59, which are pivotally connected to a pair of laterally spaced vertical members 60 which support the back wall of the platform. The links 59 converge rearwardly and are pivotally connected by a bolt 61 to an upwardly extending arm 62 fixed to the outer bearing 31. The arm 62 is held rigidly stationary by means of a bracing member 63 which extends rearwardly therefrom and is connected at its rearward end by means of a bolt 64 to the rear end of the longitudinal frame member 12.

The width of the machine from wheel to wheel allows sufficient clearance for the combine to be drawn along narrow roads and through narrow gates, but the arm 38 can be swung outwardly and attached to the platform out toward the grainward end of the latter, thus providing a sturdy support for the platform to insure against the outer end sagging. When the platform 4 is disconnected from the arms 27, 28, however, the latter arm can be swung inwardly about the pivot 36 within the width of the wheel spacing, so that the outer arm does not interfere when the combine is being transported from one field to another. Thus, according to the present invention, the motor unit and the platform supporting means can be efficiently carried in a simple manner on the single transverse beam, although an ample support for the platform is provided.

I claim:

1. In a harvester, the combination of a frame comprising a transverse beam, a pair of supporting wheels mounted on opposite ends thereof, respectively, a thresher body carried on said beam adjacent one end thereof, a harvester platform disposed transversely ahead of said beam and having laterally spaced supporting arms extending rearwardly from beneath the platform, and a rock shaft disposed generally parallel to said beam and journaled thereon adjacent the opposite end thereof, said laterally spaced supporting arms being attached at their rear ends to said rock shaft and swingable with said rockshaft about the axis of the latter to raise and lower the platform.

2. In a harvester, the combination of a frame comprising a transverse beam, a pair of supporting wheels mounted on opposite ends thereof, respectively, a thresher body carried on said beam adjacent one end thereof, a motor mounted on said beam adjacent said body and adapted to drive threshing mechanism therein, a harvester platform disposed transversely ahead of said beam and having laterally spaced supporting arms extending rearwardly from beneath the platform, and a rock shaft disposed generally parallel to and journaled in a pair of spaced bearings mounted on said beam between said motor and the other end of the beam, said laterally spaced supporting arms being attached at their rear ends to said rock shaft and swingable with said rockshaft about the axis of the latter to raise and lower the platform.

3. In a harvester, the combination of a frame comprising a transverse beam, a pair of supporting wheels mounted on opposite ends thereof, respectively, a thresher body carried on said beam adjacent one end thereof, a motor disposed above said beam and generally parallel thereto adjacent said body and adapted to drive mechanism within the latter, bracket means fixed to said beam for supporting said motor thereon, a rock shaft disposed parallel to, and journaled on said beam between said motor and the other end of the beam, a pair of laterally spaced arms attached to said rock shaft and extending forwardly therefrom, a harvester platform carried on the forward ends of said arms, another arm fixed to said rock shaft and a spring attached to the last mentioned arm for counterbalancing the weight of said platform.

4. In a harvester, the combination of a transversely disposed rigid frame, a pair of laterally spaced supporting wheels mounted thereon, a thresher body carried on said frame adjacent one side thereof, a rockable member journaled on said frame on a transverse axis, a harvester platform disposed in front of said frame at one side of said body and extending laterally beyond the supporting wheel at that side, a supporting arm for said platform, and means pivotally connecting said arm to said rockable member providing for swinging said arm to a forwardly and outwardly inclined position for connecting the outer end of the arm to the platform during normal operation, and providing for swinging said arm inwardly toward said body after the platform has been removed for transport purposes.

5. In a harvester having a mobile body, a rockable member associated therewith and supported for rocking movement about a transverse axis, a harvester platform disposed ahead of said member and extending grainwardly thereof, inner and outer supporting arms attached to said platform, said outer supporting arm being detachably connected to said platform at a point spaced grainwardly of said rockable member and inclined inwardly and rearwardly therefrom, and a movable connection between the rear end of said outer arm and said rockable member, providing for shifting said arm stubblewardly after the platform has been removed for transport purposes, but preventing relative angular movement of said arm and said rockable member about the axis of the latter.

6. In a harvester having a mobile body, a transverse rock shaft associated therewith and supported for rocking movement about a transverse axis, a harvester platform disposed ahead of said rock shaft and extending grainwardly thereof, a pair of laterally spaced inner and outer supporting arms detachably connected to said platform, the inner arm being fixed adjacent the stubbleward end of said rock shaft and the outer arm being pivotally connected to said rock shaft adjacent the grainward end of the latter for lateral swinging movement about a generally vertical axis, said outer arm being normally inclined forwardly and grainwardly during operation, but can be swung inwardly for transport purposes.

7. In a harvester, the combination of a frame comprising a transverse beam, a pair of supporting wheels mounted on opposite ends thereof, respectively, a thresher body carried on said beam adjacent one end thereof, a rock shaft disposed generally parallel to said beam and journaled thereon adjacent the opposite end thereof, a harvester platform disposed transversely and ahead of said rock shaft and extending grainwardly thereof, and means for supporting said platform on said rock shaft including an arm detachably connected to said platform at a point grainward of said beam and extending rearwardly and inwardly to said rock shaft, and a pivot connection between said arm and said rock shaft providing for swinging the arm inwardly of said beam when the platform is removed.

8. In a harvester, the combination of a frame comprising a transverse beam, a pair of supporting wheels mounted on opposite ends thereof, respectively, a thresher body carried on said beam adjacent one end thereof, a motor mounted on said beam adjacent said body and adapted to drive threshing mechanism therein, a rock shaft disposed generally parallel to and journaled on said beam between said motor and the other end of the beam, a harvester platform disposed transversely and ahead of said rock shaft and extending grainwardly thereof, and means for supporting said platform on said rock shaft including an arm detachably connected to said platform at a point grainward of said beam and extending rearwardly and inwardly to said rock shaft, and a pivot connection between said arm and said rock shaft providing for swinging the arm inwardly of said beam when the platform is removed.

9. In a harvester, the combination of a frame comprising a transverse beam, a pair of supporting wheels mounted on opposite ends thereof, respectively, a thresher body carried on said beam adjacent one end thereof, a rock shaft disposed generally parallel to said beam and journaled thereon adjacent the opposite end thereof, a harvester platform disposed transversely and ahead of said rock shaft and extending grainwardly thereof, and means for supporting said platform on said rock shaft including an arm detachably connected to said platform at a point grainward of said beam and extending rearwardly and inwardly to said rock shaft, a pivot connection between said arm and said rock shaft providing for swinging the arm inwardly of said beam when the platform is removed, a lever arm fixed to said rock shaft, and a counterbalancing spring connected to said lever to counterbalance the weight of said platform.

10. In a harvester, the combination of a frame comprising a transverse beam, a pair of supporting wheels mounted on opposite ends thereof, respectively, a thresher body carried on said beam adjacent one end thereof, a rock shaft disposed generally parallel to said beam and journaled thereon adjacent the opposite end thereof, laterally spaced supporting arms attached to said rock shaft and extending forwardly therefrom, a harvester platform carried on the forward ends of said arms, a lever arm fixed to said rock shaft, a counterbalancing spring connected at one end to said lever, a frame member spaced from said beam to which the opposite end of said spring is connected, and a bracing member fixed to said frame member at one end and having journal means connecting the opposite end to the rock shaft adjacent said lever arm.

11. In a harvester, the combination of a frame comprising a transverse beam, a stubbleward wheel mounted at one end of said beam, a depending arm fixed to the opposite end thereof, a grainward wheel journaled at the lower end of said depending arm, a rock shaft disposed generally parallel to said beam and journaled thereon, said rock shaft extending grainwardly over said grainward wheel, a harvester platform disposed ahead of said rock shaft and extending grainwardly thereof, and means for supporting said platform on said rock shaft including an arm detachably connected to said platform at a point grainward of said beam and inclined rearwardly and inwardly to said rock shaft, pivot means connecting the end of said arm to said rock shaft over said wheel, providing for lateral swinging movement of said arm between operating and transport positions after said platform is removed.

WILFRED A. BLASER.